US006892444B1

(12) United States Patent
Jenner et al.

(10) Patent No.: US 6,892,444 B1
(45) Date of Patent: May 17, 2005

(54) OPTICAL SYSTEM MANUFACTURING AND ALIGNMENT SYSTEM

(75) Inventors: Robert K. Jenner, Atkinson, NH (US); Dale C. Flanders, Lexington, MA (US); Peter S. Whitney, Lexington, MA (US); Jonathan R. Coppeta, Windham, NH (US)

(73) Assignee: Axsun Technologies, Inc., Billerica, MA (US)

( * ) Notice: Subject to any disclaimer, the term of this patent is extended or adjusted under 35 U.S.C. 154(b) by 164 days.

(21) Appl. No.: 09/667,186

(22) Filed: Sep. 21, 2000

(51) Int. Cl.[7] .................. B23P 21/00; B23P 19/00; B66C 1/42
(52) U.S. Cl. ................. 29/721; 29/759; 29/719; 29/720; 29/760; 29/407.1; 29/407.05; 29/407.04; 294/119.1
(58) Field of Search ............. 29/837, 833, 832, 29/834, 739, 740, 741, 842, 843, 845, 840, 29/407.04, 407.05, 407.1, 559, 712, 720, 29/743, 759, 760, 721; 294/119.1, 88, 86.4, 294/902, 901; 901/37, 31, 36, 32, 39, 46, 901/47; 269/42, 46, 140, 141, 142

(56) References Cited

U.S. PATENT DOCUMENTS

| 3,527,454 | A | * | 9/1970 | Humm ................... 269/45 |
| 3,651,957 | A | * | 3/1972 | Ball et al. ............... 294/106 |
| 3,824,674 | A | * | 7/1974 | Inoyama et al. ......... 29/407.05 |
| 3,908,522 | A | * | 9/1975 | Bender .................. 493/194 |
| 4,092,719 | A | * | 5/1978 | Salmon .................. 29/711 |
| 4,214,353 | A | * | 7/1980 | Kalina ................... 29/855 |
| 4,653,794 | A | * | 3/1987 | Atlas .................... 294/119.1 |
| 4,680,523 | A | * | 7/1987 | Goumas et al. ............ 318/685 |
| 4,691,905 | A | * | 9/1987 | Tamura et al. ............ 269/45 |
| 4,720,163 | A |   | 1/1988 | Goodwin et al. .......... 350/96.2 |
| 4,796,346 | A | * | 1/1989 | Kawasaki et al. .......... 29/559 |
| 4,822,091 | A | * | 4/1989 | Vermeer et al. ........... 29/740 |
| 4,833,776 | A | * | 5/1989 | Wakamiya et al. ......... 29/837 |
| 4,967,472 | A | * | 11/1990 | Ebihara et al. ........... 29/797 |
| 5,161,846 | A | * | 11/1992 | Yakou ................... 901/39 |
| 5,161,847 | A | * | 11/1992 | Yakou ................... 294/119.1 |
| 5,217,460 | A | * | 6/1993 | Knoepfler ................ 606/1 |
| 5,255,333 | A |   | 10/1993 | Althaus et al. ........... 385/33 |
| 5,295,700 | A |   | 3/1994 | Crews et al. ............. 279/5 |
| 5,388,119 | A |   | 2/1995 | Cronin et al. ............ 372/69 |
| 5,562,320 | A | * | 10/1996 | Bloomberg et al. ........ 294/119.1 |
| RE35,605  | E | * | 9/1997 | Nomaru et al. ........... 294/119.1 |

(Continued)

FOREIGN PATENT DOCUMENTS

EP        0 030 617 A2    11/1980

(Continued)

OTHER PUBLICATIONS

Goldfarb, Michael; Speich, John E., "Design of a Minimum Surface-Effect Three Degree-of-Freedom Micromanipulator," Proceedings of the 1997 IEEE International Conference on Robotics and Automation, Albuquerque, New Mexico—Apr. 1997.

(Continued)

*Primary Examiner*—Marc Jimenez
(74) *Attorney, Agent, or Firm*—J. Grant Houston

(57) ABSTRACT

An optical component manipulation system has two opposed jaws, which can each be independently positioned relative to each other in a coordinate plane to thereby effect the desired positioning of optical components within the larger system. Z-axis rigidity is provided by air-bearings. Laser heating of the jaws is used for solder, or similar heat driven bonding, processes.

23 Claims, 1 Drawing Sheet

U.S. PATENT DOCUMENTS

| | | | |
|---|---|---|---|
| 5,745,624 A | 4/1998 | Chan et al. ................... 385/91 |
| 5,760,367 A * | 6/1998 | Rosenwasser et al. . 219/121.69 |
| 5,910,894 A * | 6/1999 | Pryor ........................... 29/712 |
| 5,996,437 A * | 12/1999 | Novak et al. .................. 901/16 |
| 6,015,174 A * | 1/2000 | Raes et al. ...................... 294/2 |
| 6,034,524 A * | 3/2000 | Barringer et al. ......... 324/158.1 |
| 6,076,875 A * | 6/2000 | Neff et al. ................ 294/119.1 |
| 6,103,988 A | 8/2000 | Kim ....................... 219/121.63 |
| 6,273,483 B1 * | 8/2001 | Bone ....................... 294/119.1 |

FOREIGN PATENT DOCUMENTS

| | | | |
|---|---|---|---|
| EP | 0 286 319 A1 | | 10/1988 |
| EP | 0 356 331 A2 | | 2/1990 |
| EP | WO 99/10135 | * | 3/1999 |
| GB | 2 229 856 A | | 10/1990 |
| JP | 62058646 | | 3/1987 |
| JP | 11068243 | | 3/1999 |
| WO | WO 00/41021 | | 7/2000 |

OTHER PUBLICATIONS

Goldfarb, Michael; Speich, John E., "Eliminating Non-Smooth Nonlinearities With Compliant Manipulator Design." Proceedings of the American Control Conference, Philadelphia, Pennsylvania—Jun. 1998.

Heinen, Simon; Aymon, Cédric; Bottineli, Stefano; Clavel, Reymond, "Articulated Structures With Flexible Joints Dedicated to High Precision." Département de Microtechnique, Institute de Systèmes Robotiques (DMT-ISR), Swiss Federal Institute of Technology Lausanne (EPFL), EPFL CH-1015, Lausanne, Switzerland.

Speich, John E.; and Goldfarb, Michael, "A Three Degree-of-Freedom Flexure-Based Manipulator for High Resolution Spatial Micromanipulation." Part of the SPIE Conference on Microrobotics and Micromanipulation, Boston, Massachusetts, Nov. 1998. SPIE vol. 3519.

* cited by examiner

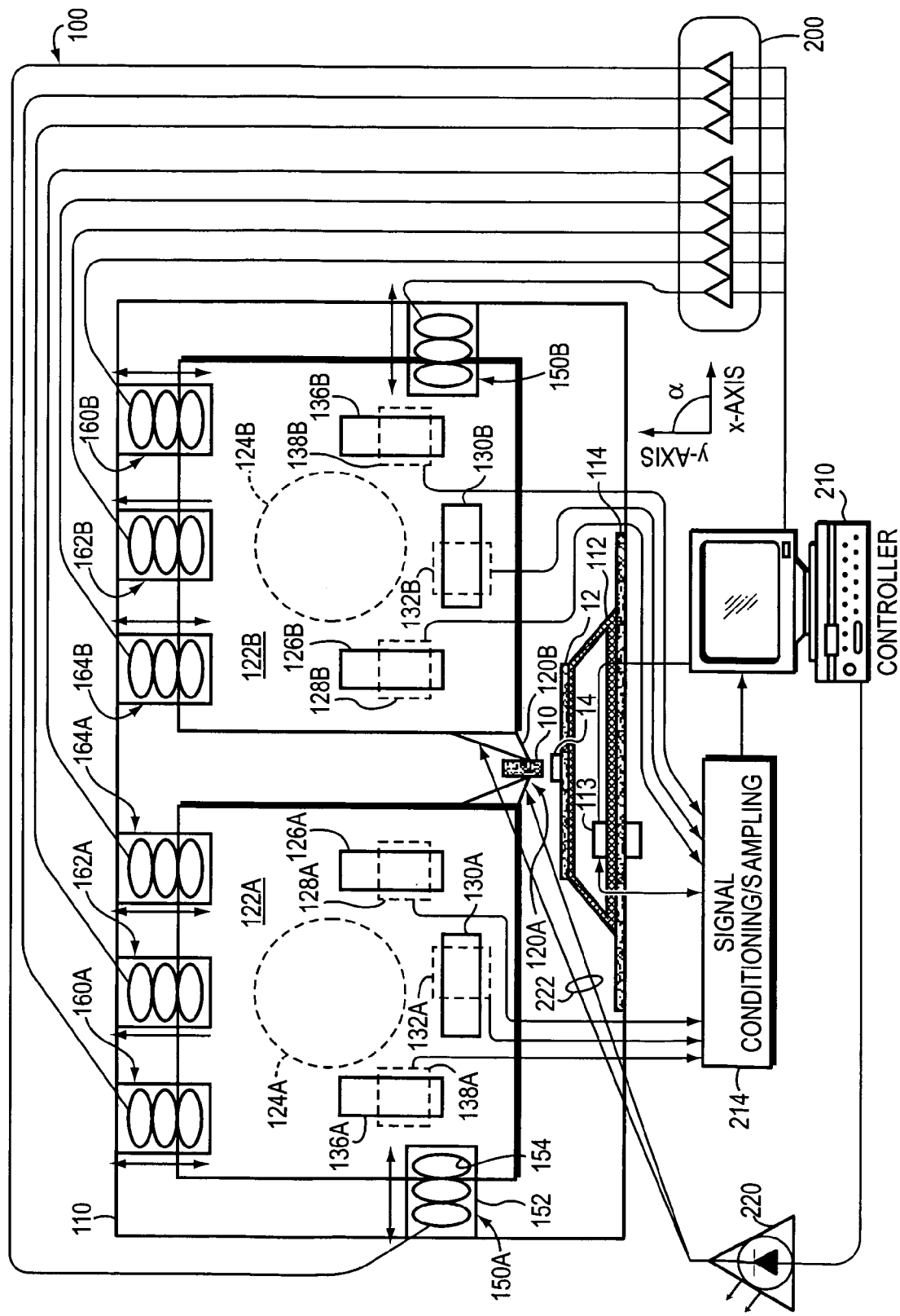

OPTICAL SYSTEM MANUFACTURING AND ALIGNMENT SYSTEM

BACKGROUND OF THE INVENTION

Component alignment is of critical importance in semiconductor and/or MEMS (micro electromechanical systems) based optical system manufacturing. The basic nature of light requires that light generating, transmitting, and modifying components must be positioned accurately with respect to one another, especially in the context of free-space-optical systems, in order to function properly and effectively in electro-optical or all optical systems. Scales characteristic of semiconductor and MEMS can necessitate micron to sub-micron alignment accuracy.

Consider the specific example of coupling a semiconductor diode laser, such as a pump or transmitter laser, to a fiber core of a single mode fiber. Only the power that is coupled into the fiber core is usable. The coupling efficiency is highly dependent on accurate alignment between the laser output facet and the core; inaccurate alignment can result in partial or complete loss of signal transmission through the optical system.

Other more general examples include optical amplification, receiving and/or processing systems. Some alignment is typically required between an optical signal source, such as the fiber endface, and a detector. In more complex systems, including tunable filters, for example, alignment is required not only to preserve signal power but also to yield high quality or high finesse systems through the suppression of undesirable optical modes within and without the systems.

Generally, there are two types of alignment strategies: active and passive. Typically in passive alignment of the optical components, registration or alignment features are fabricated directly on the components or component carriers as well as on the platform to which the components are to be mounted. The components are then mounted and bonded directly to the platform using the alignment features. In active alignment, an optical signal is transmitted through the components and detected. The alignment is performed based on the transmission characteristics to enable the highest possible performance level for the system.

In the context of commercial volume manufacturing, selection between active and passive alignment, or some mix of the two, is determined based on the quality of part needed versus the margins for the part. Lower cost, lower performance devices are typically manufactured with entirely passive alignment strategies, whereas the manufacture of high performance devices typically involves at least some active alignment.

SUMMARY OF THE INVENTION

There is thus a need in optical system manufacture for the precise manipulation of optical components relative to the substrate on which, and/or module in which, they are installed. Such manipulation includes the placement, attachment, and any subsequent positional modification to achieve the specified level of alignment. These needs transcend the specific classes of alignment strategies: active and passive.

The present invention concerns an optical component manipulation system that has two opposed jaws. In the preferred embodiments, each of these jaws can be independently positioned relative to each other. Further, each jaw may be moved either vertically and/or horizontally to effect the desired positioning of optical components within the larger system.

The optical component may be optical elements that are directly attached to the substrate or a composite components in which elements that are installed on mounting structures, which the system then manipulates.

In general, according to one aspect, the invention features an optical component manipulation system. This system comprises first and second opposed jaws. In the typical application, these jaws are used to engage either side of an optical component to manipulate, such as move, install, place and/or deform, the optical component relative to an optical substrate, bench, and/or module.

A first x-axis position detection system is used to detect an x-axis position of the first jaw and a first y-axis position detection system is used to detect a y-axis position of the first jaw. Similarly, second x-axis and y-axis position detection systems are used to detect an x-axis and y-axis positions, respectively, of the second jaw.

To manipulate the position of the first jaw along the x- and y-axis, respective first x-axis and y-axis actuator systems are provided for positioning the first jaw. Similarly, second x-axis and y-axis actuators are provided for positioning the second jaw.

In the preferred embodiment, the system further comprises a system frame and first and second air bearings between the jaws and the system frame. These air bearings provide a mechanism for z-axis support of the jaws in a low stiction fashion. More specifically, the air bearings are located between first and second stages, to which the jaws are rigidly attached, and the system frame. They prevent interfacial adhesion present between the stages at an interface with the system frame.

In one implementation, a heating system is provided for preferably both of the first and second jaws. This allows the jaws to be heated, in a controlled fashion, to effect solder bonding, for example. In the preferred embodiment, the heating system comprises a laser system that generates one or two beams that are focused on the respective jaws to irradiate the jaws and thereby control their temperature.

In the preferred embodiment, the jaws extend downward. This allows the jaws to engage an optical substrate from above and also, in some implementations, reach into a package in which the substrate or bench has been installed. Y-axis suspension systems can be used in this configuration to support the stages, and thus the jaws.

In the preferred embodiment, the actuator systems comprise voice coils, although in other implementations, other precision actuator systems are used such as linear motors and/or flexure systems, with or without piezo-electric-based actuators.

In the preferred embodiment, optical encoder/grating systems are used for the position detection systems. The gratings are attached to the stages and the encoders are attached to the system frame to provide feedback control to a controller that drives the actuators.

In the preferred embodiment, the stages and jaws have a low mass to provide for high speed positioning. In some cases, however, it may be required to add mass to the stage systems for provide for stability.

In general, according to another aspect, the invention can also be characterized in the context of an optical structure manipulation process. This process comprises engaging an optical structure with first and second jaws. In one embodiment, this engagement occurs serially. The first and second jaws are then actuated, possibly independently, to move the optical component along x- and y-axes to provide for its precise manipulation.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

The FIGURE is a schematic, elevation view of an embodiment of the optical system alignment system of the present invention in which similar reference characters refer to similar parts. The drawing is not to scale; emphasis has instead been placed upon illustrating the principles of the invention.

DETAILED DESCRIPTION OF THE PREFERRED EMBODIMENTS

The FIGURE illustrates an optical system alignment system 100, which has been constructed according to the principles of the present invention.

The alignment system 100 comprises a system frame 110. The frame provides the structural/mechanical support for the mechanical and electro-mechanical components of the system.

A substrate support frame 114 is rigidly connected to the system frame 110. A substrate holder/translator 112 is installed on the substrate frame 114.

The substrate holder/translator 112 mechanically engages a substrate 12. The mechanical engagement is currently in the form of jaws or grippers that engage the substrate 1112 and pull it into rigid engagement with a platform. Other rigid holding techniques such as a vacuum chuck system, however, are used in other embodiments.

The holder/translator 112 further has the capability to precisely position the substrate 12 along the z-axis. (The z-axis extends into the page in the FIGURE, the x and y axes are as shown.) In one embodiment a z-axis actuator, such as a voice coil or linear motor, in combination with a position detector, such as an optical encoder, 113 is used to enable precise sub-micron positioning of the substrate along the z-axis.

In operation, the alignment system 100 positions optical components 10 over and on the substrate 12. When properly positioned, the alignment system 100 then attaches the optical components 10, in one implementation. The modes of permanent attachment can be adhesive/epoxy bonding, laser welding, thermocompression, ultrasonic bonding and/or solder bonding. In this final example, solder preforms or layers 14 are formed on the substrate 12. The optical components, with potentially their own solder layer or attached preform, are then lowered onto the bench 12.

In other operational modes, the substrate 12 is delivered to the machine with some or all of the optical components 10 already permanently or temporarily attached to the substrate, and the alignment system 100 otherwise manipulates the components 10 relative to the substrate 12 and/or each other. For example, the alignment system 100 moves and/or plastically deforms the optical components 10 to achieve proper alignment in the context of an optical system formed on the top surface of the substrate/bench 12. This alignment is performed actively in one embodiment with an optical link within the optical system being activated by energizing an active element, such as laser diode on the substrate, or alternatively by supplying an optical signal from outside the optical system or module.

In order to manipulate the optical component 10, the alignment system 100 has a left and right opposed jaws 120A, 120B. These jaws extend towards each other to mechanically engage an optical component 10 therebetween. In the preferred embodiment, these jaws are constructed from a rigid material that is also thermally stable, such as a metal alloy. In the preferred embodiment, they are constructed from INVAR® material. In other embodiments, the jaws are constructed from a ceramic, for example, which is either an electrical insulator, or alternatively has been doped to render the ceramic electrically conductive.

The left and right jaws 120A, 120B are rigidly attached to and supported by respective left and right stages 122A, 122B. In the preferred embodiment, the left and right stages 122A, 122B are constructed from a rigid material. In some implementation, it has a low co-efficient of thermal expansion to improve the temperature stability of the alignment system 100 overall. In the present embodiment, the stages 122A, 122B are constructed from a machined aluminum alloy.

The left and right stages 122A, 122B are rigidly supported on the system frame 110 in the z-axis direction via a low stiction, low friction, low backlash interface. In the preferred embodiment, this interface is in the form of left and right air bearings 124A, 124B. In the illustrated embodiment, the air bearings are round. In possibly a preferred embodiment, the air bearings are square and parallel to the x and y axes to decrease the distance between the tips of the jaws 120A, 120B, which are under stress, and the support afforded by the air bearings 124A, 124B. In either case, this configuration reduces the degrees of freedom available to the stages to three, x-axis and y-axis movement and rotation around the z-axis or in the direction of angle α.

The left and right stages 122A, 122B are supported vertically, or in the direction of the y-axis by vertical support systems. In the preferred embodiment, the vertical support is via active ("floater") systems. Specifically, left and right voice coils systems 162A, 162B electromagnetically connect the left and right stages 122A, 122B, respectively, to the system frame 110. In the current embodiment, two voice coil floaters are used for each stage.

As is generally known, these voice coil systems comprise a stator 152 and a coil 154. In the current embodiment, the all of the coils 154 are rigidly attached to the stages 122 and the stators 152 are rigidly attached to the system frame 110. This configuration has the advantage of reducing stage weight at the expense of requiring electrical wiring between the frame 110 and the flying stages 122, which results in a force bias on the stages. In a possibly preferred embodiment, low mass stators are installed on the stages 122 to avoid the need for direct wiring to the stages 122.

In other embodiments, rather than voice coil systems, other precision positioning stems are used such as flexure systems with or without piezoelectric actuators and/or linear motor systems.

Positioning of the left and right stages 122A, 122B and thus the respective jaws 120A, 120B is accomplished via a system of actuators. In the preferred embodiment, a y-axis actuator system comprises a set of two voice coils for each of the left and right stages 122A, 122B. Specifically, in the context of the left stage 122A, a left y-axis actuator system comprises a first y-axis voice coil 160A and a second y-axis voice coil 164A.

As discussed previously, in the preferred embodiment, the stator 152 of each of these y-axis voice coils 160, 164 is connected to the system frame 110 and the coils are connected to the stages 122.

The first and second y-axis voice coils 160, 164 are controlled by a system controller 210 via an amplifier bank 200 to vertically position, or position along one axis, the stages 122 and corresponding jaws 120.

In the present embodiment, two y-axis voice coils 160, 164 are driven in tandem so that the stages 122A, 122B move, but parallel to the x-axis and y-axis. In a current implementation, the voice coils 164A and 164B are driven to position the respective stages and voice coils 160A, 160B are driven to prevent stage rotation or suppress stage rotation around the z-axis.

In alternative embodiments, the first and second voice coils 160, 164 are driven differentially to rotate the stages 122A, 122B around the z-axis or in the direction of angle α to thereby add a further degree of freedom in the movement in the respective jaws 120A, 120B.

In order to provide closed-loop control of the vertical position of the stages 122A, 122B and consequently the left and right jaws 120A, 120B, y-axis position is detected. Each stage 122 is provided with a y-axis position detection system. For example, in the context of the left stage 122A, the y-axis position detection system comprises a position encoder system. Specifically, in the preferred embodiment, optical encoder scheme is used, which comprises a grating 126A, which is attached to the stage 122A, and an optical detector 128A that reads the markings on the grating 126A. The optical detectors 128 are connected rigidly either directly or indirectly to the system frame 110 to detect y-axis movement of the respective stage 122.

In the current implementation, the y-axis position detection system further comprises a second set of y-axis position encoders comprising gratings 136 and encoders 138 for each stage. The second set of encoders is used to provide the feedback necessary to prevent or at least control stage rotation.

Each of the left and right stages 122A, 122B is further provided with x-axis actuators for positioning the left and right stages along the x-axis, and thus, position the corresponding left and right jaws 120A, 120B. In the preferred embodiment, these x-axis actuator systems comprise voice coil systems.

In alternative embodiments, linear motor and/or flexure actuator systems are implemented in place of the voice coils.

Specifically, in the context of the left stage 122A, the x-axis actuator comprises a voice coil 150A.

Closed loop control of the x-axis movement of the stages 122A, 122B is provided by respective x-axis position detection systems. Specifically, the x-axis position detection system of the left stage 122A comprises a grating 130A, connected to the stage, and an encoder or grating position detector 132A, which is connected to the system frame 110.

The x-axis and y-axis positional control of each of the left and right stages 122A, 122B, and thus the left and right jaws 120A, 120B, occurs under the control of a controller 210. Specifically, a signal conditioning/sampling circuit 214 receives the position encoder signals from each of the encoders for the x-axis and y-axis position detection systems for each of the stages. The signal conditioning/sampling circuit 214 then provides the responses from each of the position detection systems to the controller 210, which then drives or controls the movement of the stages via the x- and y-axis actuator systems for each of these stages 122A, 122B via the amplifier bank 200. As a result, the jaws 120A, 120B can be independently positioned to manipulate the optical component 110 in the x- and y-axis. Z-axis control of the position of the optical component 10 on the substrate or bench 12 is provided by the positional control of the z-axis stage 112 by the controller. In the preferred embodiment an optical encoder/grating system in combination with an actuator system 113 is used to detect the position of the z-axis stage.

In some applications of the alignment system 100, a force feedback scheme is used to drive the stages. This is common in applications in which the optical structures are already attached to the substrate but must be deformed in order to achieve alignment. It is also preferable where "slop" or excessive play is present due to deformation in the mechanical connection between the optical component 10 and the system 100. The play prevents accurate positioning of the optical component relative to the substrate based on stage positioning alone due to deformation of the jaws, stages, and substrate-to-z-axis stage connection.

Specifically, in the force feedback mode of operation, a desired position of the optical component relative to the substrate is determined in an active alignment search process. The force exerted on the component to reach this desired position is then recorded along with the position information from the encoders. Detection of this force is possible by monitoring the drive current to the voice coils in combination with the low stiction interface between the stages and the system frame.

In some applications, this force, rather than the position of the stages, is used to control subsequent optical deformation steps in which the stage are driven such that the recorded force is exceeded in order to initiate plastic deformation of the structure such that the structure returns to the desired position when force is removed.

In other applications, once the desired position is determined, force is removed and the optical component is allowed to settle to its position when no external, i.e., force from alignment system 100, is exerted. This initial zero-force position is recorded. Then, a force vector is calculated that will deform the component such that the component will be in the determined desired position with no force exert on the component. The component is then deformed accordingly. Subsequent iterations may be implemented to further perfect the component position through its deformation.

In some implementations, it is necessary to heat the optical component 10 as it is connected, or after it has been connected, to the bench or substrate 12. This can be accomplished through resistive heating. One drawback associated with this technique is that wire connections to the stages 122A, 122B are required. These wires can add undesirable bias forces that act on the stages 122.

In the preferred embodiment, a laser system 220 is provided under the control of the controller 210. This laser system generates two beams 222, which are respectively focused on the left and right jaws 120A, 120B. By controlling the absorption characteristics of the jaws, the radiation from the laser 220 is used to selectively heat the jaws to, for example, heat the optical component 10 to solder bond it to the substrate or bench 12.

In some implementations, it is also necessary to heat the bench 12 to effect this solder bonding. This is accomplished by heating the bench by either laser heating, a resistive heating technique, or reverse biasing the module's thermoelectric cooler.

In other embodiments, the bench and/or optical component are inductively heated.

In one embodiment the temperature of the optical component 10 and/or the jaws 120A, 120B is detected. This can be accomplished through a thermocouple system. In some application, the optical system module thermocouple is used. Alternatively, a non-contact temperature detection method is used. Specifically, an optical detector is placed in proximity to the optical component on the system frame 110 to detect black body radiation from the jaws 120A, 120B and component 10 to thereby provide temperature feedback to the controller 210.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical component manipulation system, comprising:
    first and second opposed jaws for cooperatively engaging an optical component;
    a first x-axis position detection system for detecting an x-axis position of the first jaw;
    a first y-axis position detection system for detecting a y-axis position of the first jaw;
    a second x-axis position detection system for detecting an x-axis position of the second jaw;
    a second y-axis position detection system for detecting a y-axis position of the second jaw;
    a first x-axis actuator for positioning the first jaw along the x-axis;
    a first y-axis actuator for positioning the first jaw along the y-axis;
    a second x-axis actuator for positioning the second jaw along the x-axis;
    a second y-axis actuator for positioning the second jaw along the y-axis;
    a system frame;
    a first air bearing between the second jaw and the system frame; and
    a second air bearing between the second jaw and the system frame;
    wherein a combination of the first x-axis position detection system, the first y-axis position detection system, the first x-axis actuator, the first y-axis actuator for the first jaw and the second x-axis position detection system, the second y-axis position detection system, the second x-axis actuator, and the second y-axis actuator for the second jaw enable the first jaw and the second jaw to be independently positioned in both the x-axis and y-axis directions simultaneously.

2. An optical component manipulation system as claimed in claim 1, further comprising first and second stages, to which the respective jaws, position detection systems, and actuators are attached.

3. An optical component manipulation system as described in claim 1, further comprising a jaw heater for heating at least one of the first and second jaws and thereby an optical component held by the jaws.

4. An optical component manipulation system as described in claim 3, wherein the jaw heating system comprises a laser device that irradiates at least one of the jaws.

5. An optical component manipulation system as described in claim 1, further comprising a jaw heater for heating at least one of the first and second jaws and thereby an optical component held by the jaws to a solder melting temperature.

6. An optical component manipulation system as described in claim 1, further comprising a control system for driving the first x-axis actuator, the first y-axis actuator, the second x-axis actuator, and the second y-axis actuator to position each of the first and second jaws.

7. An optical component manipulation system as described in claim 6, wherein the control system drives the first x-axis actuator, the first y-axis actuator, the second x-axis actuator, and the second y-axis actuator in response to position information from each of the first x-axis position detection system, the first y-axis position detection system, the second x-axis position detection system, and the second y-axis position.

8. An optical component manipulation system as described in claim 1, wherein the jaws extend downward to engage an optical component from above.

9. An optical component manipulation system as claimed in claim 1, further comprising first and second stages, to which the respective jaws are attached, the stages being supported by respective y-axis suspension systems.

10. An optical component manipulation system as described in claim 1, wherein each of the first and second, x- and y-actuators comprises a voice coil system.

11. An optical component manipulation system as described in claim 1, wherein each of the first and second, x- and y-position detection system comprises an optical encoder and grating.

12. An optical component manipulation system as described in claim 1, further comprising a substrate stage for positioning a substrate in a direction that is orthogonal to the x-axis and the y-axis.

13. An optical component manipulation system, comprising:
    first and second opposed jaws for cooperatively engaging an optical component;
    a first x-axis position detection system for detecting an x-axis position of the first jaw;
    a first y-axis position detection system for detecting a y-axis position of the first jaw;
    a second x-axis position detection system for detecting an x-axis position of the second jaw;
    a second y-axis position detection system for detecting a y-axis position of the second jaw;
    a first x-axis actuator for positioning the first jaw along the x-axis;
    a first y-axis actuator for positioning the first jaw along the y-axis;
    a second x-axis actuator for positioning the second jaw along the x-axis;
    a second y-axis actuator for positioning the second jaw along the y-axis; and
    first and second stages, to which the respective jaws, position detection systems, and actuators are attached;
    wherein each of the stages rides on a system frame on respective first and second air bearings and a combination of the first x-axis position detection system, the first y-axis position detection system, the first x-axis actuator, the first y-axis actuator for the first jaw and the second x-axis position detection system, the second y-axis position detection system, the second x-axis actuator, and the second y-axis actuator for the second jaw enable the first jaw and the second jaw to be independently positioned in both the x-axis and y-axis directions simultaneously.

14. An optical component manipulation system; comprising:
first and second opposed jaws for manipulating an optical component;
a first position detection system for detecting a position of the first jaw in two dimensions;
a second position detection system for detecting a position of the second jaw in the two dimensions;
a first actuator for positioning the first jaw in the two dimensions;
a second actuator for positioning the second jaw in the two dimensions;
a system frame;
a first air bearing between the second jaw and the system frame; and
a second air bearing between the second jaw and the system frame;
wherein a combination of the first position detection system and first actuator for the first jaw and the second position detection system and the second actuator for the second jaw enable the first jaw and the second jaw to be independently positioned in both the x-axis and y-axis directions simultaneously.

15. An optical component manipulation system as described in claim 14, further comprising a controller for controlling the first and second actuators in response to feedback from the first and second position detection systems.

16. An optical component manipulation system as described in claim 14, further comprising a controller for controlling the first and second actuators to independently position the first and second jaws in response to feedback from the first and second position detection systems.

17. An optical component manipulation system as described in claim 14, further comprising a substrate stage for positioning a substrate in a direction that is orthogonal to the two dimensions.

18. An optical component manipulation system as claimed in claim 14, further comprising first and second stages, to which the respective jaws, position detection systems, and actuators are attached.

19. An optical component manipulation system as described in claim 14, further comprising a jaw heater for heating at least one of the first and second jaws and thereby the optical component held by the jaws.

20. An optical component manipulation system as described in claim 19, wherein the jaw heater comprises a laser device that irradiates at least one of the jaws.

21. An optical component manipulation system as described in claim 14, wherein the jaws extend downward to engage an optical component from above.

22. An optical component manipulation system as described in claim 14, wherein each of the first and second actuators comprises a voice coil system.

23. An optical component manipulation system as described in claim 14, wherein each of the first and second position detection systems comprises an optical encoder and grating.

* * * * *